(12) United States Patent
Brundridge et al.

(10) Patent No.: US 9,589,116 B2
(45) Date of Patent: Mar. 7, 2017

(54) MANAGING HETEROGENEOUS PRODUCT FEATURES USING A UNIFIED LICENSE MANAGER

(71) Applicants: Michael A. Brundridge, Georgetown, TX (US); Gang Liu, Austin, TX (US)

(72) Inventors: Michael A. Brundridge, Georgetown, TX (US); Gang Liu, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 546 days.

(21) Appl. No.: 13/627,569

(22) Filed: Sep. 26, 2012

(65) Prior Publication Data

US 2014/0090051 A1 Mar. 27, 2014

(51) Int. Cl.
G06F 21/00 (2013.01)
G06F 21/14 (2013.01)

(52) U.S. Cl.
CPC .................................. G06F 21/14 (2013.01)

(58) Field of Classification Search
None
See application file for complete search history.

(56) References Cited

U.S. PATENT DOCUMENTS

| | | | |
|---|---|---|---|
| 7,865,445 B2 * | 1/2011 | Maeda | 705/59 |
| 8,108,667 B2 * | 1/2012 | Mittapalli et al. | 713/100 |
| 8,150,953 B2 * | 4/2012 | Mittapalli et al. | 709/223 |
| 8,156,540 B2 * | 4/2012 | Jaber et al. | 726/2 |
| 8,438,543 B2 * | 5/2013 | Carbone et al. | 717/121 |
| 8,474,015 B2 * | 6/2013 | Jaber et al. | 726/2 |
| 2005/0076208 A1 * | 4/2005 | Hori et al. | 713/165 |
| 2006/0106728 A1 * | 5/2006 | Yellai et al. | 705/59 |
| 2007/0280235 A1 * | 12/2007 | Chen et al. | 370/390 |
| 2008/0010207 A1 * | 1/2008 | Yanagihara et al. | 705/51 |
| 2008/0027742 A1 | 1/2008 | Maeda | |
| 2008/0148253 A1 * | 6/2008 | Badwe et al. | 717/174 |
| 2008/0228513 A1 * | 9/2008 | McMillan et al. | 705/1 |
| 2008/0256349 A1 * | 10/2008 | Dennis et al. | 713/1 |
| 2009/0024984 A1 | 1/2009 | Maeda | |
| 2009/0083760 A1 * | 3/2009 | Slaight | 719/313 |
| 2009/0276856 A1 * | 11/2009 | Pichetti et al. | 726/26 |
| 2009/0290716 A1 | 11/2009 | O'Connor et al. | |
| 2010/0031310 A1 | 2/2010 | Konetski et al. | |
| 2010/0191800 A1 | 7/2010 | Jaber et al. | |
| 2010/0333213 A1 * | 12/2010 | Etchegoyen | 726/29 |
| 2012/0047309 A1 * | 2/2012 | Natu et al. | 710/314 |
| 2012/0158890 A1 * | 6/2012 | Jreij et al. | 709/217 |
| 2012/0166614 A1 * | 6/2012 | Mittapalli et al. | 709/223 |

(Continued)

OTHER PUBLICATIONS

Author: Distributed Managment Task Force, Title: MCTP Overview White Paper, Version 1.0.0a, Date: Jul. 2007, DSP2016.*

(Continued)

*Primary Examiner* — Dede Zecher
*Assistant Examiner* — Richard McCoy
(74) *Attorney, Agent, or Firm* — Larson Newman, LLP

(57) ABSTRACT

An information handling system includes a device, a controller, and a license manager subsystem. The controller is configured to determine whether the device has a license assigned and to communicate with the device pursuant to a uniform protocol. The communications include issuing a command to the device to provide an identification and a command to the device to activate itself.

20 Claims, 5 Drawing Sheets

(56) References Cited

U.S. PATENT DOCUMENTS

2012/0311155 A1* 12/2012 Schmidt et al. ............. 709/226
2013/0031236 A1* 1/2013 Shah ............................ 709/223

OTHER PUBLICATIONS

Java Management Extensions (JMX) Specification, version 1.4 published Nov. 9, 2006.*
Distributed Management Task Force, Title:MCTP Overview White Paper, Version 1.0.0a, Jul. 2007 DSP2016.*
U.S. Appl. No. 13/157,714, filed Jun. 10, 2011.

* cited by examiner

MANAGING HETEROGENEOUS PRODUCT FEATURES USING A UNIFIED LICENSE MANAGER

FIELD OF THE DISCLOSURE

This disclosure generally relates to information handling systems, and more particularly relates to a system and method for managing heterogeneous product features using a unified license manager.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server, can include a network interface card, a host bus adaptor, a redundant array of independent disks, a controller, and the like. Each of these components may have a different manufacturer that can require a user of the server to acquire a license before using the component.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
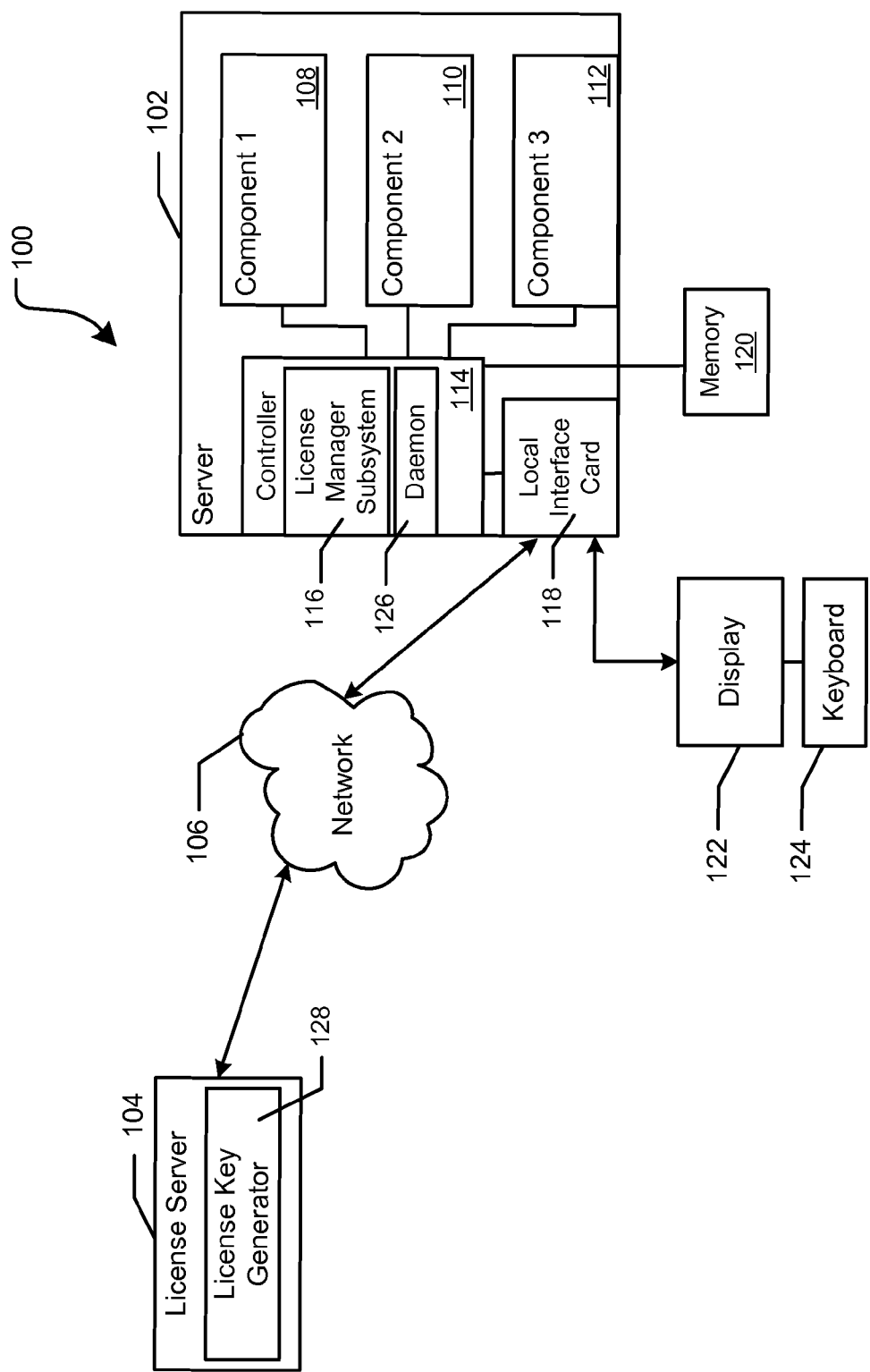
FIG. 1 is a block diagram of a licensing system for an information handling system according to an embodiment of the present disclosure.

FIG. 1 illustrates a block diagram of a licensing system 100 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The licensing system 100 includes a server 102 that communicates with a license server 104 via a network 106. The server 102 includes components 108, 110, and 112, a controller 114, and a local interface card 118. The controller 114 is in communication with the components 108, 110, and 112, with the local interface card 118, and with a memory 120. The memory 120 can be external to the server 102, or can be located within the server.

The local interface card 118 can communicate with a local display 122 and with a local keyboard 124. The local interface card 118 can be an integrated keyboard, video, and mouse (iKVM) interface card that can provide a local user with access to each of the components 108, 110, and 112. The controller 114 includes license manager 116 and daemon 126. The controller 114 can be any type of controller, such as an integrated Dell Remote Access Controller (iDRAC), which is an interface card that can provide out-of-band management of the server 102. In some embodiments, controller 114 may be a baseboard management controller (BMC), which is another interface card that can provide out-of-band management of the server 102. The controller 114 can have a processor, a memory, a battery, a network connection, and access to a server chassis bus. The controller 114 can provide different functions for the server 102 such as power management, virtual media access, and remote console capabilities. A local user can utilize the local interface card 118, the local display 122, and the keyboard 124 to communicate with the controller 114 to access, configure, or assign a license to one of the components 108, 110, and 112, and the controller 114.

The components 108, 110, and 112 in the server 102 may consist of constituent elements of server 102, and may include hardware and other subsystems. Some examples of components include embedded devices, modules providing systems management features, modules providing basic input/output system (BIOS) functionality, original equipment manufacturer (OEM) features, OEM branding, and modules providing Peripheral Component Interconnect-Express (PCIe) functionality. Separate vendors of hardware components may each require a user to receive a license to use the component.

When the server 102 is turned on, the license manager subsystem 116 can communicate with daemon process 126 to detect the components in the server. The license manager subsystem 116 can also determine whether any of the components 108, 110, and 112 require activation pursuant to a license. If so, the license manager subsystem 116 may communicate with the component over a uniform, device independent protocol to activate the component pursuant to a license. The uniform protocol may consist of a language for communications about licensing between a license manager subsystem and a component of an information handling system. The language may be capable of use by multiple devices of different types. It may also be transport and wire independent. In some embodiments, the language may consist of a series of requests and responses. In further embodiments, pursuant to the uniform protocol, the license manager subsystem 116 may send to the component a request for identification and the component may send a response pursuant to the uniform protocol. The response may provide a unique identification (ID) for the component, such as a peripheral component interconnect (PCI) ID string. In some embodiments, the response may also provide a device type and manufacturer.

The license manager subsystem 116 may then check its list of licenses against the ID of the component. It may verify that it holds a license for the component with the ID. In some embodiments, the license manager subsystem 116 may also verify that the license is for the device type and manufacturer of the component. Alternatively, the license manager subsystem 116 may determine that it does not have a license covering the component, either because it does not have a license for the type of component or because it does not have a license for the particular ID. For each component lacking a license and requiring activation pursuant to a license, the license manager subsystem 116 can request from the license server 104 a license for the component and send to the license server 104 the unique ID for the component.

The license server 104 includes a license key generator (LKG) 128 that can generate the license for a specific component based on the unique ID of the component. For example, the LKG 128 can determine whether the unique ID of a component is a proper unique ID. If the unique ID is proper, the LKG 128 can generate the license, and can sign the license with a signature. The signature can be an encrypted signature in an extensible markup language (XML) format, or the like. The license server 104 can also include the unique ID of the component within the license, such that the unique ID of the license can be matched with a unique ID of a component. In some embodiments, the license server 104 may also include the manufacturer and device type in the license.

For some components, the license for a component may delineate a specific list of features of the component to be activated by the license. The LKG 128 can also include other restrictions on the license based on licensing requirements of the manufacturer of the component. The other restrictions can be that the license is bound to a specific platform, that the license is bound to a service tag or to the unique ID, that the license has a time constraint, or the like. Binding the license to a specific platform can cause the license to be valid only for a specific system ID, such as an ID associated with the server 102. Binding the license to a specific platform can also cause the license to be valid only for a specific platform generation, such as a specific operating system generation. Binding the license to a service tag or unique ID can cause the license to be valid only for a component that has a service tag or unique ID that matches the unique ID of the license. The time constraint for the license can limit the license to a specific amount of time, indicate a start date and/or an end date of the license, indicate that the license is valid during an evaluation period, or the like. In some embodiments, the license may also include a password, passphrase, or other security token to be passed from the license manager subsystem 116 to the component. In further embodiments, the password, passphrase, or other security token may be encoded in the license so that it is not readable by a human being. In a few embodiments, LKG 128 may encode details of the license pursuant to an established protocol, in order that license manager 116 is able to parse the license to extract feature information without the need for specific instructions. LKG 128 may, for example, generate the license according to a form of XML generally used for licenses.

The license server 104 can send the license to the license manager subsystem 116 with the license being embedded in an email, via a web portal interface, via a license management tool, or the like. When the license manager subsystem 116 has received the license, the license manager subsystem can store the license in a local storage medium, such as the memory 120.

Once the license manager subsystem 116 has a license for a component available, either because it matched an already-held license with the component or because it ordered a new license and received it from the license server 104, the license manager subsystem 116 may activate the component based upon the license. In case there are restrictions on the use of the component, before activating the component the license manager subsystem 116 may parse the license to determine whether the operation of the component complies with the terms of the restrictions. If for example the licensing requires a certain operating system, the license manager subsystem 116 may determine if the component is operating under control of that operating system. If the restrictions are met, the license manager subsystem 116 may activate the component. Otherwise, the license manager subsystem 116 may refrain from activating the component under the license.

To activate a component, the license manager subsystem 116 may issue a feature enablement command to the component pursuant to the uniform protocol. The uniform protocol may provide that data about features to be enabled is passed with the command. In some embodiments, the data may be placed in a command buffer to be read by the component upon receipt of the command.

In many embodiments, the license manager subsystem 116 may transform data contained in the license into a form suitable for passing to the component. If the license contains a list of features to be enabled, for instance, the license manager subsystem 116 may abstract the set of features into a binary representation by using bitmaps. Each bit of the bitmap may represent one individual licensable feature. For example, for the licensing of an iDRAC, bit 0 may control enabling a License GUI and bit 1 may control a command-line interface (CLI). In another example, for licensing a network interface card (NIC), bit 0 could control Fibre Channel over Ethernet (FCoE) functionality and bit 1 could control Small Computer Interface over Internet (iSCSI). Both component firmware and the license manager subsystem 116 may be aware of the bit definitions, and the bit definitions can be vendor independent. In other embodiments, however, the license sent from the LKG 128 to the license manager subsystem 116 may have already encoded the feature set as a bitmap. In addition, if the license contains an encoded password, passphrase, or other security token, the license manager subsystem 116 may decode it before passing it to the component.

In further embodiments, the license manager subsystem 116 may pass the features bitmap to the component in the command buffer. The component may read the bitmap and activate the indicated features. In some embodiments, the activation step may also require the license manager subsystem 116 to pass to the component a password or other security token to indicate that the license manager subsystem 116 has the authority to activate the component. In some embodiments, a process other than a daemon process may detect the addition of components to an information handling system. The process may, for example, detect components only upon start-up or reboot.

Embodiments of FIG. 1 may simplify the process of activating a device or other component of an information handling system that requires a license for operation. The embodiments may enable the activation of devices added to the information handling system pursuant to a uniform procedure. The procedure may be completely or largely automatic. Further, in embodiments of FIG. 1, aspects of the license may be transparent to a user; that is, the user may parse the XML of the license to understand aspects of the license, such as an identification of the device under license and the list of features to be enabled. Without the use of a uniform procedure, a system administrator may be required to undergo different procedures for different manufacturers. For some devices, the procedure may require an administrator to manually enter a licensing code as part of the licensing protocol, such as entering the code into an option read-only memory (ROM) or during start-up in the disk operating system (DOS). Further, the license code may be an arbitrary string of characters that does not convey information to a system administrator about operation of the license.

Figure 2:
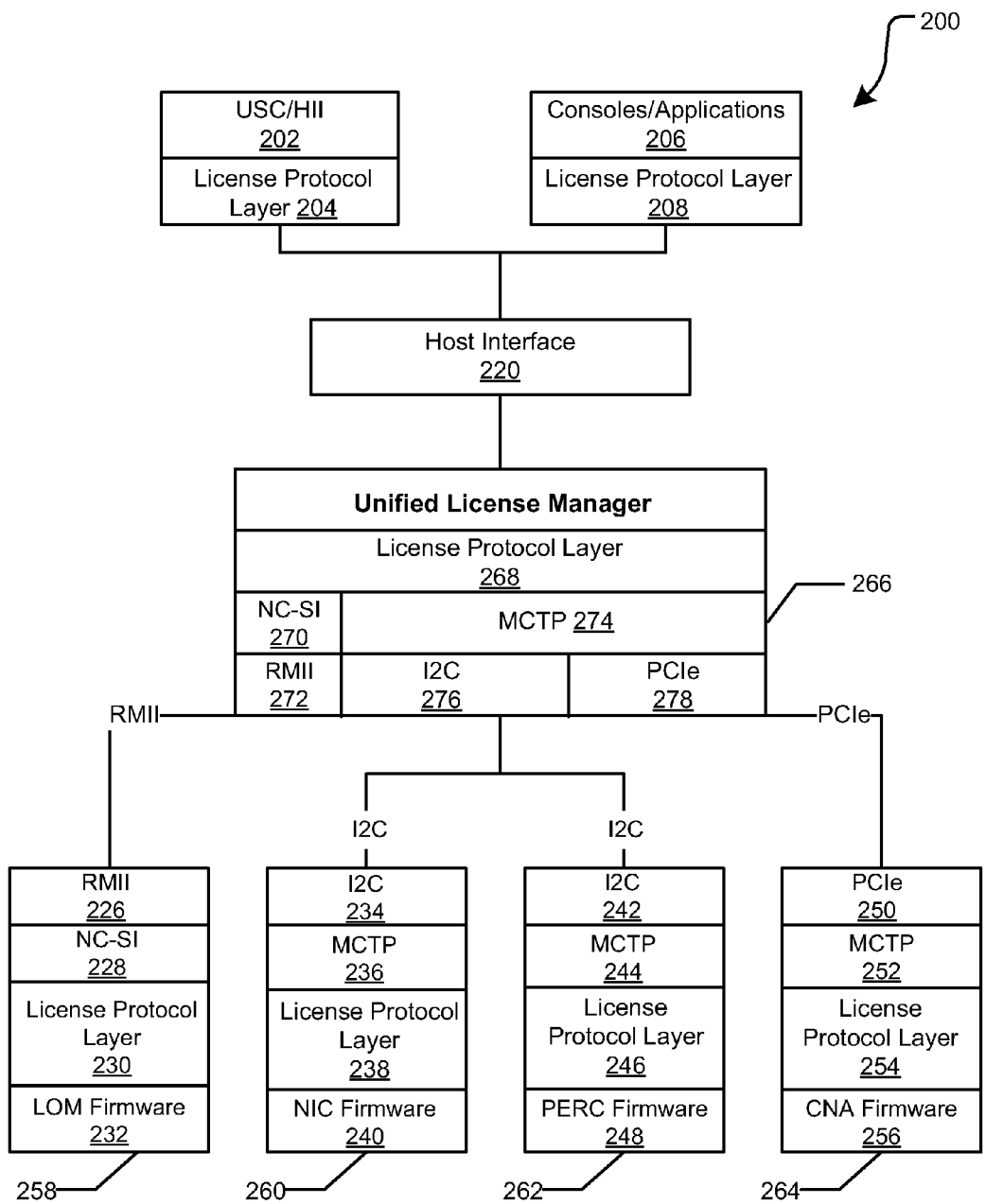
FIG. 2 is another block diagram of a licensing system for an information handling system according to an embodiment of the present disclosure.

FIG. 2 shows the components of a system 200 to manage licenses for components of a computing device. The managing system 200 includes Unified Server Configurator (USC)/Human Interface Infrastructure (HII) 202, consoles/applications 206, host interface 220, unified license manager 266, and components 258, 260, 262, and 264.

Unified license manager 266 includes license protocol layer 268, Network Controller Sideband Interface (NC-SI) 270, Management Component Transport Protocol (MCTP) 274, Reduced Media Independent Interface (RMII) 272, Inter-Integrated Circuit (I²C) 272, I²C 274, and PCIe 278. Unified license manager 266 may manage licenses for components of an information handling system such as a server. It may detect components in the information handling system, determine if they require licenses, communicate with them to obtain information used in obtaining licenses, request the licenses, activate the components, deactivate and remove the licenses, and communicate information about the licenses to management systems. In some embodiments, unified license manager 266 may be the license manager subsystem 116 of the controller 114 of FIG. 1.

License protocol layer 268 may provide for carrying out licensing transactions under a uniform protocol. The transactions may include obtaining an identification of a component, activating the component, removing a license, and requesting a unique identification from a component. Unified license manager 266 may operate under a variety of management software tools and under a variety of bus connections to components of an information handling system. In the embodiment of FIG. 2, unified license manager 266 may operate under both NC-SI, in NC-SI layer 270, and MCTP, in MCTP layer 274. MCTP is a media-independent protocol for intercommunication among intelligent devices within the platform management subsystem of a managed computer system. NC-SI is an electrical interface and protocol defined by the Distributed Management Task Force that may enable the connection of a baseboard management controller to a network interface controller in server computer systems for the purpose of enabling out-of-band remote manageability.

NC-SI layer 270 communicates with component 258 over an RMII bus protocol. An MII bus (standardized by IEEE 802.3u) may connect different types of physical transceivers to Media Access Controllers (MAC). Thus, any MAC may be used with any transceiver, independent of the network signal transmission media.

MCTP layer 274 communicates with components 260, 262, and 264 both over I²C and PCIe buses through I²C layer 275 and PCIe layers 278 respectively. I²C is a multi-master, two-wire serial bus. It may be used to attach peripherals to a motherboard. In other embodiments, unified license manager 266 may operate under other management protocols or through other bus methods of communication.

In some embodiments, unified license manager 266 may communicate with the components 258, 260, 262, and 264 under a uniform, device-independent, management-protocol-independent, wire independent communications protocol. The communications protocol may provide for the unified license manager 266 to issue such commands as Request Device Information, Feature Enablement, Revoke License, and Assign Unique License Device ID to components connected to an information handling system. The Request Device Information command may request information about a component, such as an identification, a type, or a manufacturer. The Feature Enablement command may instruct the component to activate itself. The Revoke License command may inform the component that the license has been revoked, and that the component is to cease operations. The Assign Unique License Device ID may request a unique identification from the component for use in a license. The commands may be embedded as commands in the management protocols. In some embodiments, the license protocol payload over NC-SI may be carried in OEM command (0x50) and response (0xD0). For MCTP, a license command may be carried within message type 0x7E, with the "Application Type" byte set to 0x01 for a licensing message.

Host interface 220 may provide an interface between unified license manager 266 and USC/HII 202, and between unified license manager 266 and consoles/applications 206. USC/HII 202 and consoles/applications 206 are interfaces for system management and may be used to configure the components that have been activated by unified license manager 266. USC/HII 202 may provide an embedded configuration utility that may reside on an embedded flash memory card. It may be launched during the boot sequence, and may function in a pre-operating system environment. USC/HII 202 may enable systems and storage management tasks from an embedded environment throughout the life cycle of a system. Consoles/applications 206 are a console and software to enable a system administrator to control an information-handling system. USC/HII 202 and Consoles/applications 206 include license protocol layers 204 and 208, respectively. The license protocol layers handle licensing details, such as which components have been licensed.

Components 258, 260, 262, and 264 are connected to unified license manager 266 through buses RMII, I²C, and PCIe. Each component has a software layer for the wire communications, layers RMII 226, I²C 234, and I²C 242, and PCIe 250 respectively; layers for communicating according to the management protocols, layers NC-SI 228, MCTP 236, MCTP 244, and MCTP 252 respectively; license protocol layers 230, 238, 246, and 254 respectively; and firmware layers, Local Area Network (LAN) on a motherboard (LOM) firmware 232, NIC firmware 240, PowerEdge™ redundant array of independent disks (RAID) Controller (PERC) firmware 242, and converged network adapter (CNA) firmware 256, respectively. PowerEdge™ is a proprietary Dell server.

License protocol layers 230, 238, 246, and 254 implement uniform protocols for communicating with unified license manager 266 concerning licensing operations. The license protocol layers may enable components 258, 260, 262, and 264 to interpret and respond to licensing commands such as those described above. In some embodiments, to be compliant with the protocols, the license protocol layers of unified license manager 266 and components 258, 260, 262, and 264 are required to implement certain licensing commands. The implementation of other commands may be optional for compliance. In further embodiments, the Assign Unique License Device ID may be optional and the other commands may be mandatory.

Firmware 232, 240, 248, and 256 may include code contained in non-volatile memory, such as flash memory, for integrating a component with an operating system. In some embodiments, the firmware may contain data to be used in the licensing process, such as a unique identification number for the component, a password or other security token for the component, or a license key or a license number. In some embodiments, the data must be matched with data supplied to the component during the licensing process before the component can be activated. In addition, when a bitmap or other representation of features to be activated is passed to the component, the firmware may be able to parse the bitmap or other representation, determine which features are to be activated, and activate those features.

In the embodiment of FIG. 2, component 258 may be a LOM, and LOM firmware 232 may support the LOM. Component 260 may be a network interface card, and NIC firmware 240 may support the NIC. Component 262 may be RAID controller and PERC firmware 248 may support the RAID controller. Component 264 may be a CNA, a computer input/output device that combines the functionality of a host bus adapter with a network interface controller. A single card may provide access to both a storage area network and a general-purpose computer network. CNA firmware 256 may support the CNA 264.

In FIG. 2, components 258, 260, 262, and 264 are connected to an information-handling system through buses RMII, I²C, and PCIe and operate under management protocols NC-SI and MCTP. In other embodiments, components may be connected through other wire or bus methods of communication and may operate under other management protocols.

Figure 3:
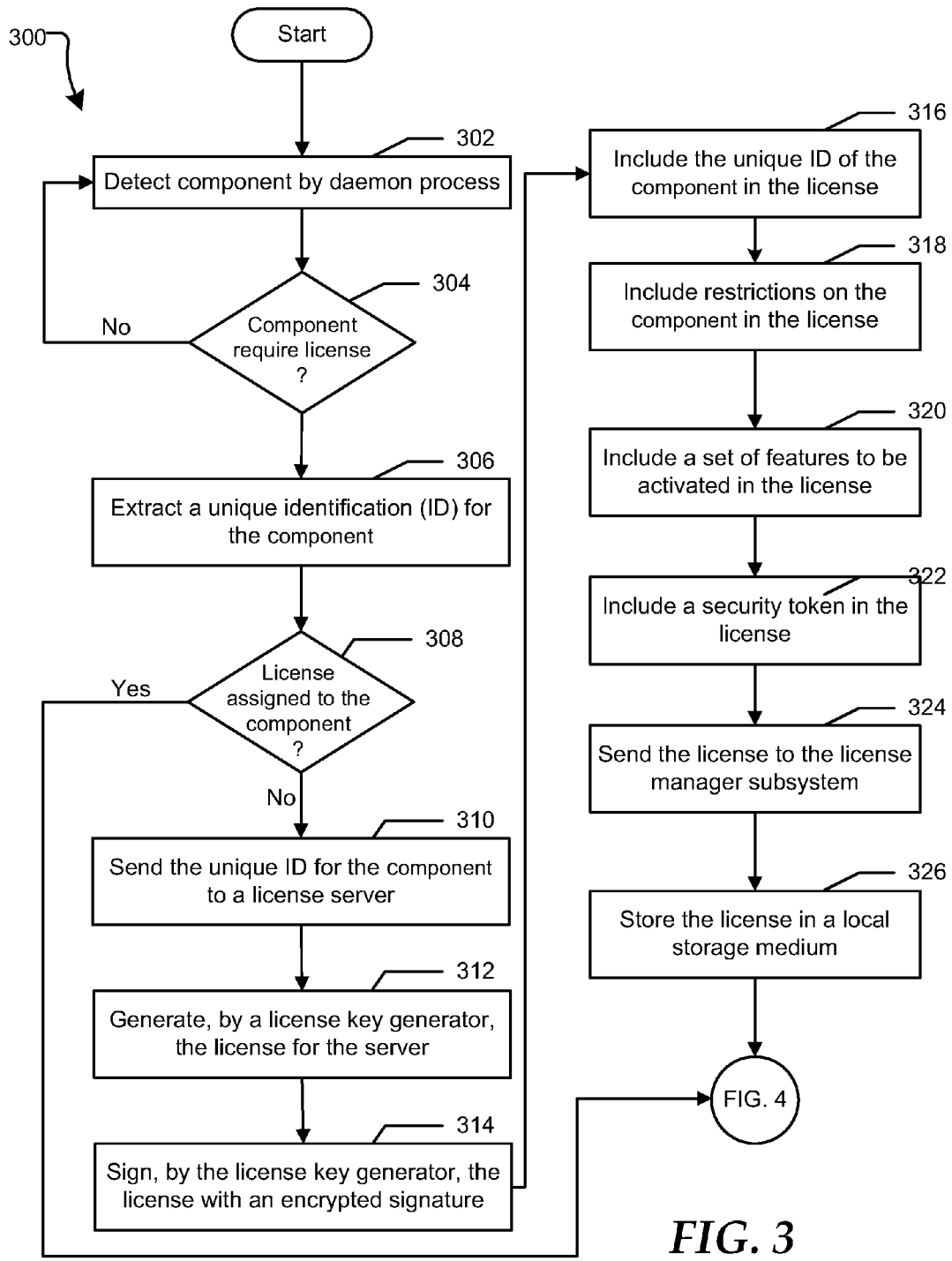
FIGS. 3 and 4 are a flow diagram of a method for assigning a license to the information handling system according to an embodiment of the present disclosure.
Figure 4:
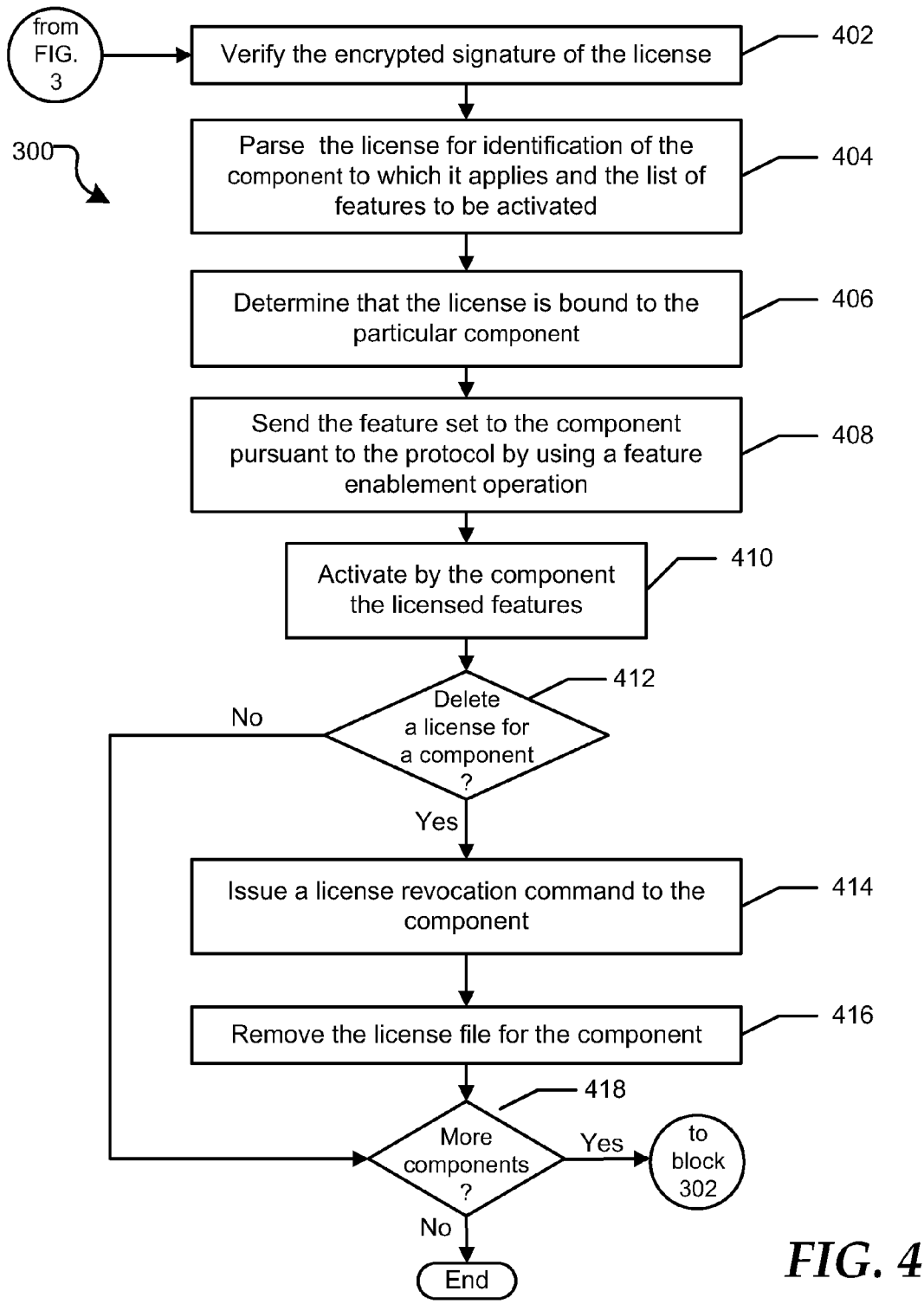

FIGS. 3 and 4 illustrate a method 300 for managing licenses for components of an information handling system, such as a server. At block 302, a daemon process of the information handling system detects a component, such as when a server is turned on or a component is added to the server. At block 304, a determination is made whether the component requires a license for activation. If the component does not require a license, either because it has already been activated pursuant to a license or because the component does not require a license to operate, the method returns to block 302, to examine the next component. If the component requires a license to be activated, a license manager subsystem may issue to the component a request for a unique identification (ID) for the component at block 306. The license manager subsystem may extract the ID from the response to the request. The unique ID can be a peripheral component interconnect (PCI) ID string. In some embodiments, a unique ID is unnecessary. In some embodiments, the license manager subsystem may have already obtained a unique ID for the component, and it is unnecessary to request the ID.

At block 308, a determination is made whether a license is assigned to the component. The license manager subsystem may check if a license for the component is contained in a list of licenses. The license manager subsystem may maintain the list in non-volatile storage, or the list may be stored in another component of the information handling system, such as USC/HII or firmware, and the license manager subsystem may ask the other component about the status of a license for the component. In some embodiments, the licenses are stored by type of component and by unique ID. The license manager subsystem may check if there is a license for the type of component; and if so, for the component with that unique ID.

If a license was already obtained for the component, the flow proceeds to block 402 of FIG. 4. Otherwise, the unique ID for the component is returned to the license manager subsystem and the unique ID for the component is sent from the license manager subsystem to a license server to request the license for the components at block 310. The license for the component is generated by a license key generator based on the unique ID of the specific component at block 312. The license can be in an extensible markup language (XML) format, or the like. At block 314, the license is signed with an encrypted signature. The unique ID of the component is included within the license at block 316.

At block 318, restrictions on the license are included in the license based on licensing requirements of a manufacturer of the component. The restrictions can be that the license is bound to a specific platform, that the license is bound to a service tag or the unique ID, that the license has a time constraint, or the like. Binding the license to a specific platform can cause the license to be valid only for a specific system ID, such as an ID associated with the server. Binding the license to a specific platform can also cause the license to be valid only for a specific platform generation, such as a specific operating system generation. Binding the license to a service tag or unique ID can cause the license to be valid only for a component that has service tag or unique ID that matches the unique ID of the license. The time constraint for the license can limit the license for a specific amount of time, indicate a start date and/or and end date of the license, indicate that the license is valid during an evaluation period, or the like.

At block 320, a data structure delineating a specific list of features of the component to be activated by the license is included in the license. In some embodiments, the license may abstract the feature sets into a binary representation by using bitmaps. Each bit of the bitmap may represent one individual licensable feature. A value of 1 is a position may indicate that a feature is to be activated, and a value of 0 may indicate that the feature is not to be activated. Both component firmware and the license manager subsystem 116 may be aware of the bit definitions, and the bit definitions can be vendor independent. In other embodiments, the license manager subsystem may parse the license to obtain a list of features and may represent the list with a bitmap. In still other embodiments, another representation of features may be used or a representation may be unnecessary because activation does not involve specification of a list of features.

At block 322, a password, passphrase, or other security token is included in the license. The security token is to be passed by the license manager subsystem to the component as part of activation of the component in accordance with the license. The use of a security token to be passed to the component is optional. In some embodiments, a security token for activation of the component is not included in the license. At block 324, the license is sent to the license manager subsystem. The license can be sent via email, via a web portal interface, via a license management tool, or the like. The license is stored in a local storage medium in response to the license manager subsystem receiving the license at block 326. Flow now proceeds to block 402 of FIG. 4.

At block 402, the encrypted signature of the license is verified. At block 404, the license is parsed for identification of the component to which it applies and the list of features to be activated. In some embodiments, the license may also be parsed to obtain a password or other security token to pass to the component for activation. The license may consist of an XML document and parsing the license may require parsing the XML. The list of features may then be represented as a bitmap. For example, the following may illustrate a small portion of an XML license that describes the features of a component to be activated:

compared with a manufacturer and type of the component specified in the license. In some embodiments, the manufacturer and type may be supplied by the component. In many embodiments, the manufacturer and type may consist of four fields, the vendor, the device type, the sub vendor, and the sub device type. A sub vendor may be a manufacturer which makes a product for another vendor. In further embodiments, the last two fields may be optional.

At block 408, the feature set is sent to the component pursuant to the uniform protocol by using a "Feature Enablement" operation. The operation may be implemented as a command in a management protocol, such as NC-SI or MCTP, if the component communicates with a controller under that management protocol. In some embodiments, data may be sent along with a "Feature Enablement" request. A bitmap representing features to be enabled may, for example, be placed in a buffer to be made available to the component. In some embodiments, a password, passphrase, or other token may also be passed to the component.

At block 410, the component activates the licensed features. Firmware of the component may parse the bitmap to determine which features to activate. The firmware may also verify a password, passphrase, or other security token, if one is included with the "Feature Enablement" command. The firmware may also return the bit map to the license manager subsystem for verification if needed.

In addition to activating licenses, the license manager subsystem may delete licenses. It may determine whether to delete a license, at block 412. If the determination is made, the license manager subsystem may issue a license revoca-

```
<lns:LicenseData>
    ....
        <lns:Feature lns:ID="1" lns:Description="License Manager Interface"
    lns:Enabled="true"/>
        <lns:Feature lns:ID="2" lns:Description="RACADM CLI" lns:Enabled="true"/>
        <lns:Feature lns:ID="3" lns:Description="WSMAN protocol stack"
    lns:Enabled="true"/>
        <lns:Feature lns:ID="4" lns:Description="SNMP GET/MIB and Alerts"
    lns:Enabled="true"/>
        <lns:Feature lns:ID="5" lns:Description="Auto-Discovery" lns:Enabled="true"/>
        <lns:Feature lns:ID="6" lns:Description="USC firmware update (Pre-OS)"
    lns:Enabled="true"/>
        <lns:Feature lns:ID="7" lns:Description="Firmware update In-band Customer Tier
    1 OS" lns:Enabled="true"/>
        <lns:Feature lns:ID="4" lns:Description="USC operating system deployment with
    driver media" lns:Enabled="true"/>
        <lns:Feature lns:ID="9" lns:Description="USC device configuration"
    lns:Enabled="true"/>
    ...
</lns:LicenseData>
```

This list of features may be bit mapped into 32 bits and transmitted to the component to be activated. An enabled feature may be represented as a 1 and a feature not enabled may be represented as a zero. In the above example, the above feature set may be represented by the 32-bit number 0x00 0x00 0x01 0xff, where the 0x prefix indicates that the following two digits are in hexadecimal and where "f" indicates the number 1111 in binary. In this case, feature descriptors 1 through 9 may be mapped to bits 24 through 32, where 32 is the least significant bit, and no other features may be activated.

At block 406, in the case of a newly-created license, a determination is made that the license is bound to the particular component. The component is verified by comparing the unique ID of the component with the unique ID in the license. In some embodiments, the manufacturer of the component and the type of the component may also be tion command to the component, at block 414. In some embodiments, implementation of a "Revoke License" command may be mandatory for devices and controllers adhering to the licensing protocol. If the delete action has been selected, the license file is removed from the specific component and the license file is unassigned at block 416.

If the delete action has been performed or a delete action was not selected, at block 418 the license manager subsystem determines whether there are any other components that may need a license. If so, flow returns to block 302. Otherwise, the method ends.

Figure 5:
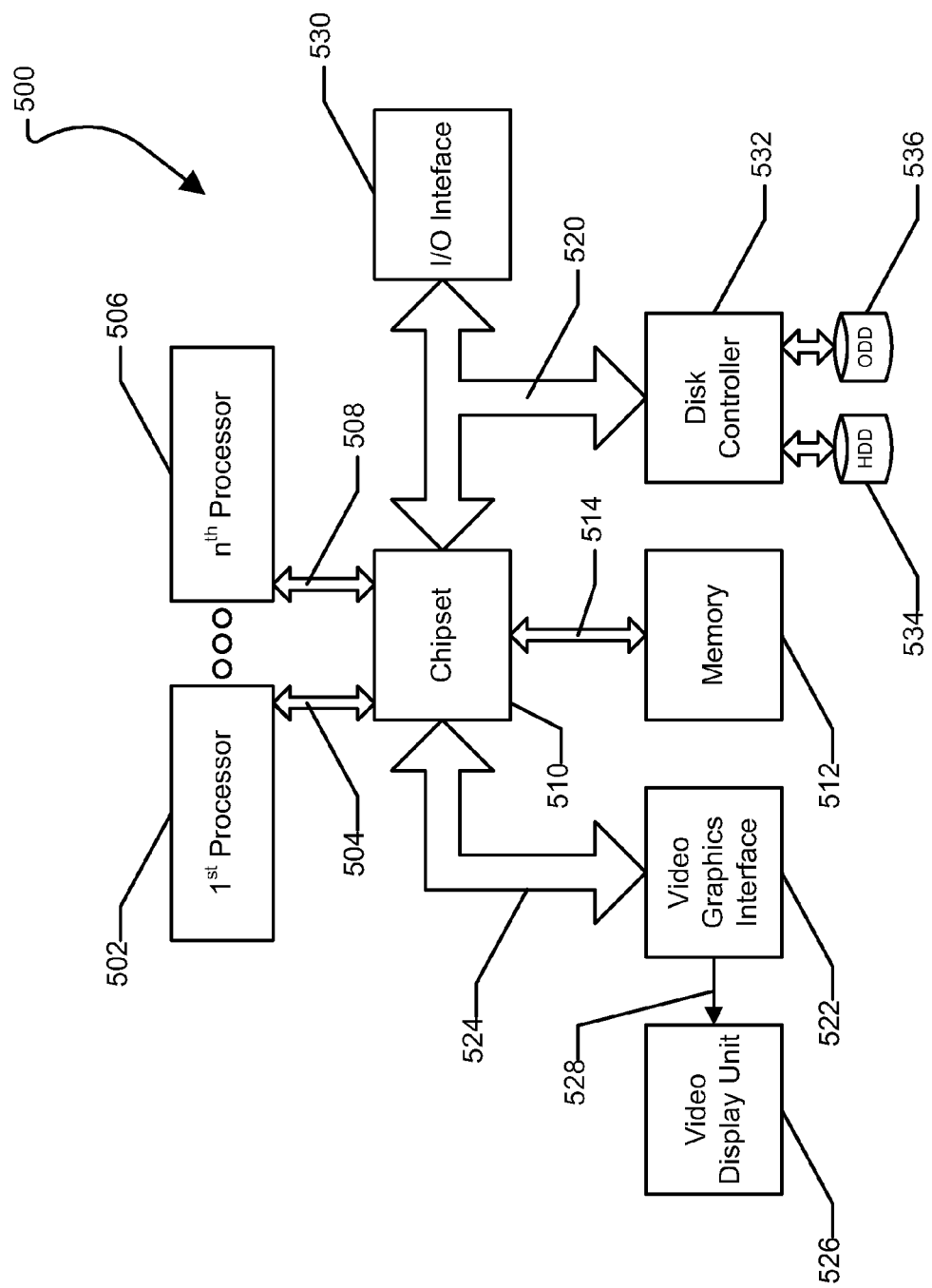
FIG. 5 is a block diagram of a general information handling system according to an embodiment of the present disclosure.

As shown in FIG. 5, the information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504.

Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 5 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail herein, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computing device comprising:
    a component;
    a device detector to detect when the component is connected to the computing device; and
    a license manager subsystem in communication with the device detector to determine that the component requires a license in order to be activated and to communicate with the component pursuant to a uniform protocol for communicating with devices for licensing purposes, the communicating with the component comprising issuing commands to the component pursuant to the uniform protocol, the commands including a command to the component for identification of the component and a command to the component to activate itself pursuant to the license.

2. The computing device of claim 1 wherein the license manager subsystem is included in a baseboard management controller of the computing device.

3. The computing device of claim 1 wherein, pursuant to the uniform protocol, the command to the component to activate itself provides for passing data with the command, the data describing features to be activated pursuant to the command.

4. The computing device of claim 3 wherein the commands include a command to the component for a unique identification of the component.

5. The computing device of claim 1 wherein:
the component is a first type of device made by a first manufacturer;
the device detector is further to detect when a second device, a second type of device made by a second manufacturer, is connected to the computing device;
the issuing commands to the component pursuant to the uniform protocol comprises issuing commands to the component carried over a first management protocol; and
the license manager subsystem is to determine that the second device requires a license in order to be activated and to communicate with the second device pursuant to the uniform protocol for communicating with devices for licensing purposes, wherein the communications with the second device comprise issuing commands to the second device pursuant to the uniform protocol, wherein the commands are carried over a second management protocol.

6. The computing device of claim 5 wherein:
the issuing commands pursuant to the first management protocol comprises issuing commands carried over the Management Component Transport Protocol (MCTP); and
the issuing commands pursuant to the second management protocol comprises issuing commands carried over the Network Controller Sideband Interface (NC-SI).

7. The computing device of claim 6 wherein:
the computing device comprises a baseboard management controller containing the license manager subsystem;
the commands carried over MCTP pass between the baseboard management controller and the component over an Inter-Integrated Circuit ($I^2C$) or a Peripheral Component Interconnect-Express (PCIe) link; and
the commands carried over NC-SI pass between the baseboard management controller and the second device over a Reduced Media Independent Interface (RMII) link.

8. The computing device of claim 3 wherein, pursuant to the uniform protocol, the command to the component to activate itself provides for passing a security token with the command, the security token to be checked by firmware of the component.

9. The computing device of claim 4 wherein the commands include a command to the component to revoke the license.

10. The computing device of claim 3 wherein the license manager subsystem is further to receive the license from a licensing server, to parse the license to verify that the license is issued under a unique identification of the component, to parse the license to determine features enabled under the license, and to generate a data structure to delineate the features, wherein the data passed along with the command to the component to activate itself includes the data structure.

11. A component comprising:
an interface to connect the component to a computing device;
a license manager subsystem to communicate with a baseboard management controller of the computing device to:
receive commands pursuant to a uniform protocol for communicating with devices for licensing purposes, the commands including a command to the component for identification of the component and a command to the component to activate itself pursuant to a license; and
respond to the commands, the response comprising sending information about licenses to the baseboard management controller; and
firmware in communication with the license manager subsystem to activate the component upon receipt by the license manager subsystem of an activation command and to deactivate the component upon receipt by the license manager subsystem of a command to revoke the license.

12. The component of claim 11 further comprising the computing device.

13. The component of claim 11 wherein the license manager subsystem is to receive from the baseboard management controller a data structure delineating the features of the component to be activated by the license and to parse the data structure to determine the features of the component to be activated by the license.

14. The component of claim 11 wherein the license manager subsystem is to receive from the baseboard management controller a security token and to verify the validity of the security token before activating the component under the license.

15. A method comprising:
detecting by a computing device a component connected to the computing device;
determining that the component requires a license in order to be activated; and
communicating with the component pursuant to a uniform protocol for communicating with devices for licensing purposes, the communicating comprising:
issuing a first command to the component pursuant to the uniform protocol for identification of the component; and
issuing a second command to the component pursuant to the uniform protocol to activate itself pursuant to the license, wherein the uniform protocol applies to communications between the computing device and several types of devices over a plurality of communication links.

16. The method of claim 15 wherein the issuing the command to activate the component comprises passing data with the command, the data describing features to be activated pursuant to the command.

17. The method of claim 15 wherein the issuing the command for identification of the component comprises issuing a command to the component to provide a unique identification.

18. The method of claim 15 further comprising receiving the license via email, via a web portal interface, via a license management tool, or via any combination thereof.

19. The method of claim 15 wherein:
the issuing the command to the component pursuant to the uniform protocol for identification of the component and the issuing the command to the component pursuant to the uniform protocol to activate itself pursuant to the license comprise issuing the commands over Management Component Transport Protocol and sending the commands over an Inter-Integrated Circuit or a Peripheral Component Interconnect-Express link; and
the method further comprises:

detecting a second device connected to the computing device, wherein the second device is a different type than the component and made by a different manufacturer;

determining that the second device requires a second license in order to be activated;

acquiring the second license; and communicating with the second device pursuant to the uniform protocol for communicating with devices for licensing purposes, the communicating comprising:

issuing over a Reduced Media Independent Interface (RMII) link a command to the second device pursuant to the uniform protocol for identification of the second device, the command carried over an Network Controller Sideband Interface (NC-SI) uniform protocol; and issuing over the RMII link a command to the second device pursuant to the uniform protocol to activate itself pursuant to the second license, the command carried over NC-SI.

20. The method of claim 15 further comprising issuing a command to the component pursuant to the uniform protocol to revoke the license.

* * * * *